(12) United States Patent
Fukuda et al.

(10) Patent No.: US 8,742,294 B2
(45) Date of Patent: Jun. 3, 2014

(54) MIG WELDED JOINT BETWEEN ALUMINUM AND STEEL MEMBERS AND MIG WELDING PROCESS

(75) Inventors: Toshihiko Fukuda, Ohbu (JP); Masaki Kumagai, Nagoya (JP)

(73) Assignee: Sumitomo Light Metal Industries, Ltd., Minato-Ku (JP)

( * ) Notice: Subject to any disclaimer, the term of this patent is extended or adjusted under 35 U.S.C. 154(b) by 1535 days.

(21) Appl. No.: 12/033,970

(22) Filed: Feb. 20, 2008

(65) Prior Publication Data

US 2008/0206594 A1    Aug. 28, 2008

(30) Foreign Application Priority Data

Feb. 27, 2007    (JP) .................................. 2007-047767

(51) Int. Cl.
- *B23K 9/00*     (2006.01)
- *B23K 9/173*    (2006.01)
- *B23K 9/23*     (2006.01)

(52) U.S. Cl.
CPC ................. *B23K 9/173* (2013.01); *B23K 9/232* (2013.01); *B23K 2203/18* (2013.01)
USPC .......................... 219/136; 219/137 R; 428/653

(58) Field of Classification Search
USPC .......... 219/72, 73, 74, 76, 76.14, 136, 136 R, 219/137 PS, 137 WM, 137.2, 383, 117, 11
See application file for complete search history.

(56) References Cited

U.S. PATENT DOCUMENTS

| | | | | |
|---|---|---|---|---|
| 4,937,426 A | * | 6/1990 | Nishikawa et al. | ...... 219/124.34 |
| 5,667,709 A | * | 9/1997 | Ueyama et al. | .......... 219/137 PS |
| 6,544,358 B1 | * | 4/2003 | Carr et al. | ..................... 148/440 |
| 2006/0275623 A1 | * | 12/2006 | Takeda et al. | .................. 428/653 |

FOREIGN PATENT DOCUMENTS

| | | | |
|---|---|---|---|
| DE | 103 04 954 A1 | 8/2004 | |
| EP | 1 728 578 A1 | 12/2006 | |
| JP | 54-159359 | 12/1979 | |
| JP | 59-050992 | 3/1984 | |
| JP | 04-270072 | 9/1992 | |
| JP | 2003-033865 A1 | 2/2003 | |
| JP | 2003-211270 * | 7/2003 | .............. B23K 9/23 |
| JP | 2003-211270 A1 | 7/2003 | |
| JP | 2004-223548 * | 8/2004 | .............. B23K 9/23 |
| JP | 2004-223548 A1 | 8/2004 | |
| JP | 2006-088174 A1 | 4/2006 | |
| JP | 2006-116599 A1 | 5/2006 | |
| JP | 2006-224145 A1 | 8/2006 | |
| JP | 2006-224147 A1 | 8/2006 | |
| WO | 02/43913 A1 | 2/2002 | |
| WO | WO 02/43913 A1 * | 6/2002 | .............. B23K 5/10 |
| WO | WO 2004043639 A1 * | 5/2004 | .............. B23K 9/00 |

OTHER PUBLICATIONS

U.S. Appl. No. 12/033,964, filed Feb. 20, 2008, Fukada et al.

* cited by examiner

*Primary Examiner* — Tu B Hoang
*Assistant Examiner* — Thien S Tran
(74) *Attorney, Agent, or Firm* — Burr & Brown, PLLC

(57) ABSTRACT

A MIG welded joint between aluminum and steel members is obtained by overlapping the aluminum member and the steel member each other and performing MIG welding using a filler wire made of a 4000 or 5000 series aluminum alloy on an end face of the overlapped aluminum member, wherein the aluminum member has a thickness P ranging from 0.5 to 2.0 mm, and the steel member has a thickness Q satisfying the following formula: $0.6 \leq Q/P \leq 0.8$.

8 Claims, 3 Drawing Sheets

MIG WELDED JOINT BETWEEN ALUMINUM AND STEEL MEMBERS AND MIG WELDING PROCESS

This application is based on Japanese Patent Application No. 2007-047767 filed on Feb. 27, 2007, the contents of which are incorporated hereinto by reference.

BACKGROUND OF THE INVENTION

1. Field of the Invention

The present invention relates to a metal inert gas (MIG) welded joint between aluminum and steel members and a MIG welding process, and in particular to a MIG welding technique used for welding an overlapped region which is made by overlapping planar portions of dissimilar materials, namely, the aluminum and steel members.

2. Description of the Related Art

In recent years, from the viewpoint of protecting the global environment and saving energy, there is required restriction of emissions of harmful gases and carbon dioxide emitted by automobiles, and also required improvement of mileage. In order to respond to such requirements, reduction in weight of vehicle body is the most effective to meet the requirement, so that there are actively studied replacements of steel members with aluminum members, as members to form body parts and other various parts. However, in terms of production cost, it is difficult to convert all the members of vehicle body parts and components into aluminum members. Thus, when the member formed of aluminum is used, it is inevitable to perform dissimilar metal welding between aluminum and steel, namely, hybrid welding, which has been a major concern. In addition, the hybrid welding between aluminum and steel is required not only in the field of transportation vehicles represented by the above-mentioned automobiles, but also in other various fields relating to home electric appliances, construction materials such as building materials, and the like. In those fields, strong welding is an essential requirement.

Therefore, there have been studied various processes of joining together an aluminum member and a steel member, which include the following mechanical connection, such as connection by caulking or using a riveting or a bolt. However, each of these processes inherently has problems in terms of an efficiency of the joining operation, a reliability of the joint, and a cost of the joint, to a greater or less extent.

In addition, considerable improvement in productivity can be expected by employing a conventional fusion welding process such as arc welding commonly used for welding metal members. However, when aluminum and steel members are welded by such a fusion welding process, heat input at the time of welding becomes excessively high and a metallurgical reaction occurs between the molten aluminum and steel members. Thereby, at a welded interface between those members, a brittle and hard intermetallic compound (such as $Fe_2Al_5$ or $FeAl_3$) is thickly formed. In consequence, the portion where the compound is formed suffers cracks, so that the applicable joint strength to a practical use cannot be obtained. As can be seen from the above, it has been extremely difficult to perform melt welding between aluminum and steel members.

In a patent document 1 (JP-A-2003-211270), a patent document 2 (JP-A-2003-33865), a patent document 3 (JP-A-2004-223548), a patent document 4 (JP-A-2006-88174), a patent document 5 (JP-A-2006-116599), a patent document 6 (JP-A-2006-224145) and a patent document 7 (JP-A-2006-224147), there are disclosed various processes for welding dissimilar metals of aluminum and steel members by using a MIG welding process, which is a kind of arc welding. However, in the patent document 1, since aluminum and steel members are directly welded by a MIG brazing process using a wire made of copper alloy or nickel alloy, welding cost is increased and a sufficient welding strength is unlikely to be obtained. Therefore, there is still a room for improvement. In the patent document 2, as a filler metal, a flux cored wire is employed in which the flux containing at least caesium fluoride, aluminum fluoride, potassium fluoride, and aluminum oxide as components is coated with aluminum member, thereby suppressing formation of a brittle and thick intermetallic compound layer. However, since the flux remains as slag on a surface of a weld zone, an operation to remove the slag, which covers the surface thereof, is necessary. Thus, problems such as productivity deterioration and an increase in product cost are inherent in the process disclosed in the patent document 2.

In the patent documents 3 to 7, as a filler wire, instead of a brazing filler metal or a flux cored wire, there is employed a solid wire made of aluminum alloy. However, without any particular consideration about a thickness relationship between aluminum and steel members, aluminum and steel members having the same thickness are welded, or a steel member thicker than an aluminum member is welded therewith. Accordingly, even if control is provided to reduce heat input, due to a great difference between rigidities of both members, in other words, due to greater rigidity or stiffness of the steel member than that of the aluminum member (in the case of the same thickness, a rigidity ratio of steel member to aluminum member is about 3 to 1), stress by thermal distortion concentrates when solidification shrinkage occurs after a welding process, whereby local deformation occurs at a weld zone. Accordingly, there is a problem that a defective portion is generated and thus a sufficient joint strength cannot be secured.

In the patent documents 3 to 7, the employed steel members are surface-coated with zinc or zinc-alloy and aluminum or aluminum alloy. There is no disclosure about a process for performing MIG welding between a bare steel member and an aluminum member. Therefore, there has been a desire for a welding process that can form a sound weld zone between aluminum and steel members and secure a sufficient joint strength regardless of the presence or absence of a surface-coated layer or a surface-treated layer on a steel member surface.

SUMMARY OF THE INVENTION

The present invention has been made in the light of the situations described above. It is therefore a first object of the invention to provide a MIG welded joint between aluminum and steel members, which has enhanced soundness of a weld zone and an excellent joint strength. It is a second object of the invention to provide a process for performing MIG welding between aluminum and steel members, in which control is provided in order to reduce heat input, when the MIG welding is performed between the dissimilar members overlapped with each other, thereby effectively increasing the soundness of the weld zone.

The first object described above may be achieved according to a first aspect of the present invention, which provides a MIG welded joint between aluminum and steel members obtained by overlapping the aluminum member and the steel member with each other and performing MIG welding using a filler wire made of a 4000 or 5000 series aluminum alloy on an end face of the overlapped aluminum member, wherein the aluminum member has a thickness P ranging from 0.5 to 2.0 mm, and the steel member has a thickness Q satisfying the following formula: $0.6 \leq Q/P \leq 0.8$.

In a preferred form of the MIG welded joint between aluminum and steel members according to the first aspect of the present invention, the aluminum member has a tensile strength of 90 MPa or more in an O temper condition.

In a preferred form of the MIG welded joint between aluminum and steel members according to the first aspect of the present invention, a surface ripple including 5 to 50 convexities per welded length of 1 cm is formed in a weld zone of the aluminum member and the steel member. The convexities have 10 μm or more in height.

The second object of the present invention may be achieved according to a second aspect of the present invention, which provides a process for performing MEG welding between aluminum and steel members, by overlapping the aluminum member and the steel member with each other and perforating a MIG welding operation on an end face of the aluminum member, comprising the steps of: (A) providing the aluminum member having a thickness P ranging from 0.5 to 2.0 mm and the steel member having a thickness Q satisfying the following formula: $0.6 \leq Q/P\ 0.8$; (B) providing a filler wire made of a 4000 or 5000 series aluminum alloy having a diameter L ranging from 0.8 to 1.6 mm; (C) locating the filler wire such that, a center line of the filler wire is positioned between a distance of L away from a reference point toward an overlapped region of the aluminum and the steel members and a distance of 2L away from the reference point toward a side opposite to the overlapped region, the reference point being set at a corner of an end face of the aluminum member on the steel member side; and (D) applying a pulsed DC allowing a spray transfer to be caused in which one molten droplet falls with each pulse at a pulse frequency of 0.5 to 5 times per a welding length of 1 mm, whereby the MIG welding operation is performed along the end face of the aluminum member.

In a preferred form of the MIG welding process between aluminum and steel members according to the second aspect of the invention, the aluminum member has tensile strength of 90 MPa or more in an O temper condition. More preferably, the aluminum member is made of one of a 5000 series aluminum alloy, a 6000 series aluminum alloy, and a 7000 series aluminum alloy.

In another preferred form of the MIG welding process between aluminum and steel members according to the second aspect of the invention, the steel member is made of one of non-surface-coated mild steel, carbon steel, high tensile strength steel, and stainless steel.

In another preferred form of the MIG welding process between aluminum and steel members according to the second aspect of the invention, the steel member is made of one of hot-dip zinc-coated steel, galvannealed steel, aluminum alloy coated steel, and electrogalvanized steel.

As described above, in the MIG welded joint between aluminum and steel members according to the first aspect of the present invention, the members are overlapped with each other, and the overlapped aluminum member has the thickness P ranging from 0.5 to 2.0 mm, which can reduce heat input required to melt the end face of the aluminum member by an arc. As a result, it is effectively prevented that a brittle intermetallic compound layer is thickly formed at a welded interface between the members. In addition, the thickness Q of the overlapped steel member satisfies the formula: $0.6 \leq Q/P \leq 0.8$. In other words, a ratio of the thickness Q of the overlapped steel member to the thickness P of the overlapped aluminum member (Q/P) falls within the range of 0.6 to 0.8, thereby appropriately uniforming the rigidity of the members. Accordingly, in time of solidification shrinkage after welding process, it is possible to prevent the generation of a defective portion which is caused by concentration of stress due to thermal distortion and the subsequent local deformation at the weld zone.

In the MIG welded joint between aluminum and steel members according to the first aspect of the present invention, the aluminum and steel members are overlapped with each other and the MIG welding is performed on the end face region of the overlapped aluminum member by using the filler wire made of the aluminum alloy, thereby eliminating the operation to remove slag and preparation of a large-scale equipment. Consequently, as compared to welding using a brazing filler metal or a flux cored wire, productivity is improved and resulting in reduction of production cost.

In addition, the filler wire is made of a 4000 or 5000 series aluminum alloy. This increases the strength of a weld metal, thereby realizing strong welding between the aluminum and steel members.

As described above, in the MIG welded joint between aluminum and steel members according to the first aspect of the present invention, it is prevented that a brittle intermetallic compound layer is thickly formed at a welded interface and also prevented deformation due to thermal distortion at the weld zone, whereby the soundness of the weld zone is favorably increased and the aluminum and steel members are strongly welded with each other by the weld metal at the weld zone. Therefore, the MIG welded joint according to the first aspect of the present invention can highly secure joint efficiency, which indicates joint strength (a ratio of a breaking strength of the joint member under tension to a breaking strength of the aluminum member as a joint base metal or a joint base material under tension).

In one of the preferred forms of the MIG welded joint between aluminum and steel members according to the first aspect of the present invention, there is employed the aluminum member having a tensile strength of 90 MPa or more in an O temper condition, thereby improving a breaking stress of the welded joint in tension.

In one of the preferred forms of the MIG welded joint between aluminum and steel members according to the first aspect of the present invention, a surface ripple including 5 to 50 convexities having 10 μm or more in height is formed in a weld zone of the aluminum member and the steel member per welded length (length in a welding direction) of 1 cm, thereby maintaining low heat input without increasing temperature thereof excessively high when the MIG welding is performed. As a result, the penetration of the steel member caused by excessively high temperature of the molten metal can be prevented to the maximum extent possible, whereby the improved joint strength can be obtained.

In the MIG welding process between the aluminum and steel members according to the second aspect of the present invention, those members are overlapped with each other, and the thickness P (mm) of the overlapped aluminum member is set from 0.5 to 2.0 mm, while the thickness Q (mm) of the overlapped steel member is set so as to satisfy the formula: $0.6 \leq Q/P \leq 0.8$, thereby effectively preventing the formation of a thick brittle intermetallic compound layer at the welded interface between the aluminum and steel members and the generation of defective portion by local deformation at the weld zone.

In the MIG welding process according to the second aspect of the present invention, the filler wire is made of the 4000 or 5000 series aluminum alloy, thereby, as described above, highly securing the strength of the weld metal and realizing stronger welding between the aluminum and steel members.

In the MIG welding process according to the present invention, the filler wire having the diameter L ranging from 0.8 to 1.6 mm is employed, thereby favorably preventing a welding current required to melt the filler wire from becoming excessively high. In addition, the filler wire is arranged such that the center line thereof is positioned within the range of a predetermined distance in the proximity of the end face of the aluminum member. More specifically, with the reference point is set at a corner of an end face of the aluminum member on the steel member side, the center line of the filler wire is arranged so as to be positioned between a distance of L away from the reference point toward the overlapped region and a distance of 2L away from the reference point toward a side opposite to the overlapped region, thereby generating arc above the intended welded region (in the proximity of the end face of the aluminum member) and the end face region of the aluminum member can be effectively molten without increasing heat input. Accordingly, the aluminum and steel members can be welded with a high welding quality.

In the MIG welding process according to the second aspect of the present invention, the MIG welding operation is performed by applying the pulsed DC allowing the spray transfer in which one molten droplet falls with each pulse at a pulse frequency of 0.5 to 5 times per a welding length of 1 mm to the filler wire. According to the process, heat input can be controlled at low temperature without becoming excessively high. Accordingly, the aluminum member having a melting point lower than the steel member can be efficiently molten, the occurrence of a defective portion due to insufficient melting can be prevented, and penetration of the steel member can be favorably suppressed. As a result, it can be prevented that a thick intermetallic compound layer is formed at the welded interface. In addition, due to the employment of the pulsed DC instead of AC, the filler wire is constantly connected to a positive pole (anode), thereby sufficiently exhibiting cleaning action to remove an oxide film on the welded material. Therefore, the molten aluminum can favorably be spread wettingly over a surface of the steel member without being shed therefrom. As a result, the aluminum member can be favorably welded with the steel member, and a sound weld zone can be formed.

Consequently, in the MIG welding process between aluminum and steel members according to the second aspect of the present invention, low heat input can be maintained. Thus, while the aluminum member can be sufficiently molten, the penetration of the steel member can be maximally prevented. This can effectively prevent formation of a brittle intermetallic compound layer at the welded interface between the members and occurrences such as local deformation due to a rigidity difference between the aluminum and steel members. Thereby, the soundness of the weld zone can be effectively improved and the obtained welded joint can be favorably prevented from breaking or separating at the welded interface.

In the preferred form of the MIG welding process between aluminum and steel members according to the second aspect of the present invention, there is employed the aluminum member having tensile strength of 90 MPa or more in an O temper condition. More preferably, there is employed the aluminum member made of one of a 5000 series aluminum alloy, a 6000 series aluminum alloy, and a 7000 series aluminum alloy. Using any one of the aluminum alloys allows a breaking stress under tension of the welded joint to be further improved.

In another preferred form of the MIG welding process according to the second aspect of the present invention, the steel member is made of one of non-surface-coated mild steel, carbon steel, high tensile strength steel, and stainless steel, thereby allowing the penetration of the steel member to be shallow and obtaining a welded joint having an excellent joint strength. In other words, according to the second aspect of the present invention, without forming a layer subjected to surface treatment or surface coating such as plating on the steel member surface, the aluminum and steel members can be welded with each other with an excellent welding quality.

In another preferred form of the MIG welding process between aluminum and steel members according to the second aspect of the present invention, the steel member is made of one of hot-dip zinc-coated steel, galvannealed steel, aluminum alloy coated steel, and electrogalvanized steel, whereby the arc and the molten metal are not directly contacted with the steel member due to the presence of the surface-coated layer. As a result, the penetration of the steel member can be more favorably prevented and formation of a brittle intermetallic compound layer can be prevented.

BRIEF DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE INVENTION

Figure 1:
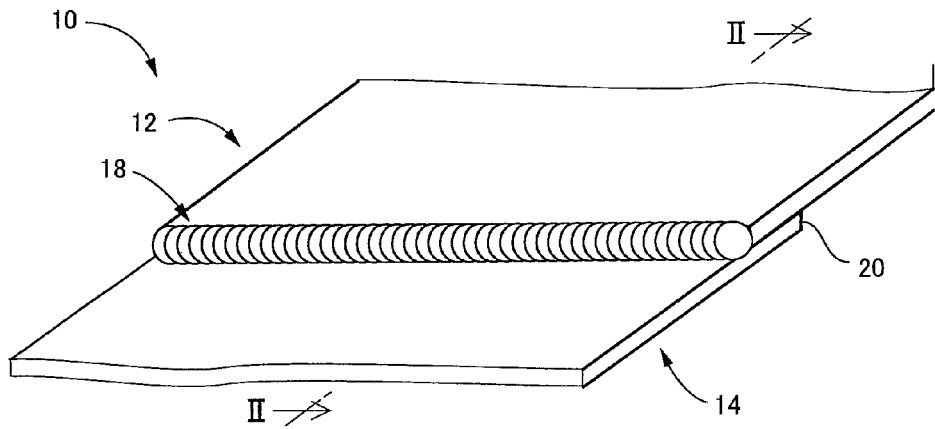
FIG. 1 is a perspective view showing an example of a MIG welded joint between aluminum and steel members according to the present invention.

To further clarify the present invention, there will be described preferred embodiments of the invention by referring to the drawings.

Figure 2:
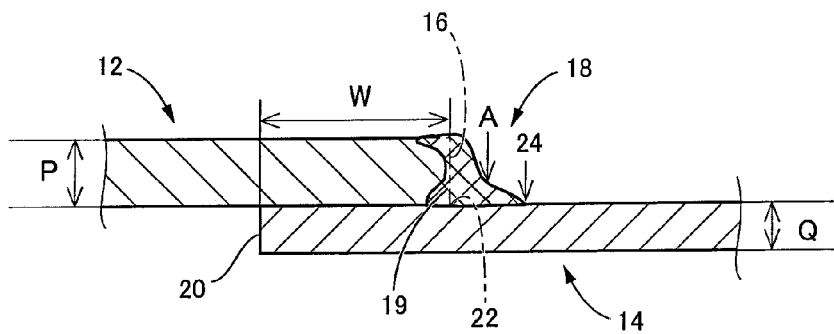
FIG. 2 is a cross sectional view taken along line II-II of FIG. 1.

Referring first to FIGS. 1 and 2, there are shown a perspective view and an axial cross sectional view, respectively, schematically showing an embodiment of a MIG welded joint between aluminum and steel members according to the present invention. As shown in FIGS. 1 and 2, in a state where an aluminum member 12 having planar shape and a steel member 14 having planer shape that have different thicknesses are overlapped with each other at end regions thereof in such a manner that the aluminum member 12 is positioned on top of the steel member 14, the region of an end face 16 (indicated by a single-dot chain line in FIG. 2) of the aluminum member 12 is welded by MIG welding (lap fillet welding) to form a weld zone 18 which integrates the members, thereby forming a MIG welded joint 10.

As shown in FIG. 1, in this embodiment, the aluminum member 12 and the steel member 14 are welded together over an entire length of an overlapped region thereof. Therefore, the weld zone 18 is formed so as to extend continuously over the entire length thereof along the end face 16 of the aluminum member 12. As shown in FIG. 2, the weld zone 18 has a substantially triangular sectional shape combining orthogonal two surfaces, namely, the end face 16 of the aluminum member 12 and an upper surface of the steel member 14.

Of the two metal members to be welded, which are overlapped in upper and lower directions as described above, a material of the aluminum member 12 located at the upper side is not particularly limited as long as it is aluminum or an aluminum alloy. The material thereof is selected appropriately in accordance with characteristics required for an intended joint. It is preferable to employ the material having tensile strength of 90 MPa or more in an O temper condition (aluminum material, which is designated as a temper O according to JIS (Japanese Industrial Standards) H 0001, and which is in the softest state by annealing). However, the temper of the aluminum member subjected to the MIG welding is not limited to O temper and the temper may be any temper of O, H, T or the like. In the present invention, the tensile strength is a strength measured based on a "metal material tensile test method" defined in the JIS Z 2241. When the tensile strength is less than 90 MPa, a breaking can easily occur in the aluminum member 12 as the base metal even if strength deterioration of the weld zone 18 can be suppressed due to no brittle intermetallic compound layer is formed in the weld zone 18. This is attributed to a fact that even if there is used an aluminum member (for example, H material) which is thermally refined or well tempered to obtain higher strength, at the time of welding, a portion affected by heat (a portion which is not molten but thermally affected) in the proximity of the weld zone generally has a strength substantially equal to that of the O temper material. Among such aluminum materials, particularly, aluminum alloys of 5000 series (Al—Mg series), 6000 series (Al—Mg—Si series), and 7000 series (Al—Zn—Mg series), based on the JIS or AA alloy numbering system, are suitable as construction materials of construction products such as a body panel or decorative panel in vehicle. Additionally, since those alloys have an excellent strength, a high meltability and a high weldability, they are employed more favorably.

Meanwhile, the material of the steel member 14 located at the lower side is also not limited to a particular one and can be selected appropriately in accordance with characteristics required for an intended joint. For example, the steel member 14 may be made of mild steel, carbon steel, high tensile steel, stainless steel or the like. Additionally, the steel member 14 may be surface-coated or surface-treated steel such as a hot-dip zinc-coated steel or galvanized iron (GI), a galvannealed steel or galvanized and annealed iron (GA), an aluminum alloy coated steel, and an electrogalvanized steel which are subjected to conventionally known surface treatment with zinc, zinc alloy, aluminum or aluminum alloy, or may not be surface-coated steel. In the case of employment of a surface-coated steel member, due to the presence of a surface-coated layer formed on the steel member surface, an arc or a weld metal does not directly contact with the steel member, thereby effectively preventing penetration of the steel member and further preventing formation of a brittle intermetallic compound layer generated by a metallurgical reaction between aluminum and steel.

The shapes of the aluminum member 12 and the steel member 14 are not limited to planar shape as long as the overlapped region subjected to a MIG welding operation has at least a planar or face-plate shape. The members may have any one of various shapes produced by a known technique such as rolling, extruding, or forging. In general, a plate material, an extrusion material, or an extrusion-molded material is advantageously employed in which a portion to be welded has a planer or face-plate shape.

In the present embodiment, in order to maintain low heat input, the aluminum member 12 positioned over the steel member 14 has a thickness P ranging from 0.5 to 2.0 mm. This is because heat input required at MIG welding corresponds to the thickness P of the aluminum member 12. That is, when the thickness P thereof exceeds 2.0 mm, high heat input is required to melt the end face region of the aluminum member 12 and the steel member 14 having a melting temperature higher than the aluminum member 12 is also molten and penetrated by arc heat. Therefore, a brittle intermetallic compound is easily formed at the weld zone between the aluminum member 12 and the steel member 14, resulting in reduction of joint strength. Whereas when the thickness P of the aluminum member is less than 0.5 mm, a withstand load of the aluminum member becomes too small and thus it is not practical to use it as a construction material. Furthermore, at the time of MIG welding, heat cannot easily be dissipated from the weld zone of the aluminum member 12 and can be accumulated thereat, whereby the aluminum member 12 becomes easily melted and a size precision of the MIG welded joint 10 is deteriorated.

In the present embodiment, a thickness Q of the steel member 14 positioned under the aluminum member 12 is in a range of 0.3 to 1.6 mm, which is thinner than the aluminum member 12 by a predetermined size. Specifically, the thickness is set in such a way that a ratio Q/P, i.e., the thickness Q (mm) of the steel member to the thickness P (mm) of the aluminum member 12, falls within the range of 0.6 to 0.8. This adequately uniforms rigidities of the aluminum member 12 and the steel member 14. Accordingly, when solidification shrinkage occurs after welding process, it is possible to effectively prevent the generation of a defective portion which is caused by concentration of a stress due to thermal distortion and the subsequent local deformation at the weld zone. In other words, if the ratio of the thickness Q of the steel member 14 to the thickness P of the aluminum member 12 (Q/P) falls outside the above range, local deformation occurs at the weld zone 18, thereby generating a defective portion. If the steel member 14 is made of steel subjected to surface treatment as mentioned above, from a practical viewpoint, a sum of the thickness of a bare steel member before surface treatment and the thickness of a surface-coated layer is set as the thickness Q of the steel member 14.

Furthermore, an overlap width W between the aluminum member 12 and the steel member 14 can be set appropriately in accordance with the thickness of the aluminum member 12. Preferably, when the thickness P of the aluminum member 12 is 1 mm or less, the overlap width W is set to be 3 mm or more. If the thickness P exceeds 1 mm, preferably the overlap width W is set to be 3 times or more than the thickness P of the aluminum member 12, that is, it is preferable to be 3P or more. This is because, when the overlap width W becomes too small, heat input to the weld zone 18 is conducted to an end face 20 of the steel member 14. The heat is not dissipated outside and added as a reflected heat to the weld zone 18. As a result, due to the excessive input heat, a brittle intermetallic compound layer is thickly formed, thereby reducing the joint strength.

Thus, as described above, in the MIG welded joint 10 of the present embodiment, under the state where the aluminum member 12 and the steel member 14 having mutually different thicknesses are overlapped with each other, the MIG welding is performed on the end face region of the aluminum member 12 to integrate the two members. In this case, particularly, without using a brazing filler metal or a flux, the weld zone 18 is formed by the MIG welding using a filler wire (filler metal) made of the aluminum alloy of 4000 series (Al—Si series) or 5000 series (Al—Mg series), thus, a weld metal 19 has a high strength. Therefore, the aluminum member 12 and the steel member 14 are strongly welded with each other, so that joint strength of the MIG welded joint 10 can be highly secured. Additionally, since it is unnecessary to remove the slag and prepare a large-scale equipment, production cost can be reduced as compared to a case of using a brazing filler metal, a flux cored wire, or the like.

Figure 3:
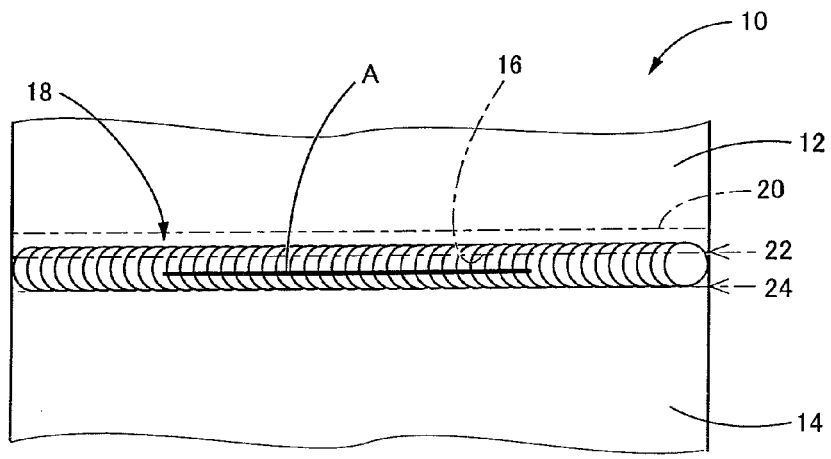
FIG. 3 is a plan view of FIG. 1.

In the weld zone 18 of the MIG welded joint 10 of the present embodiment, the surface ripple is formed such that the surface ripple includes 5 to 50 convexities per welded length of 1 cm and the convexities have 10 μm or more in height. In the present invention, the surface ripple is an imbricate pattern of concavities and convexities formed in a bead portion (weld zone 18) as shown in FIGS. 1 and 3. In the present invention, the number of the convexities of the surface ripple is determined in the welding direction as follows. Specifically, a middle section A (a bold line in FIG. 3) located between the corner 22 on the steel member side of the edge surface 16 of the aluminum member 12 and a weld toe 24 on the steel member 14 is set as a measurement location. Then, the concavities and convexities are measured by a measurement device such as a contour-measuring instrument in the welding direction (leftward and rightward direction in FIG. 3). The convexity of the surface ripple is counted as one when there is 10 μm or more difference in height between convexity (protrusion) and adjacent one of two concavities (recessed portions), whereby the number of the convexities of the surface ripple per welded length of 1 cm is determined. It should be understood that the number of the convexities of the surface ripple is determined in a stationary weld zone which is in the stable welding condition and not in non-stationary weld zone.

When the number of the convexities of the surface ripple measured as above is less than 5 per the welded length of 1 cm, the temperature of the weld metal contacting the steel member 14 at the time of MIG welding is considered to be high. In this case, the steel member 14 is melt by the weld metal having high temperature and a brittle intermetallic compound layer is thickly formed on the interface between the weld metal 19 and the steel member 14. Consequently, the sufficient strength of joint may not be obtained. When the number of the convexities of the surface ripple is more than 50, the input heat per unit length become excessively high and brittle intermetallic compound layer is thickly formed on the welded interface, whereby the sufficient strength of joint may not be obtained.

Since the MIG welded joint 10 of the embodiment has the foregoing characteristic structure, the low heat input at the MIG welding can be maintained. Therefore, the soundness of the weld zone 18 can be improved and an excellent joint strength can be obtained. Consequently, the MIG welded joint 10 having the excellent joint strength can be favorably used for a vehicle body panel, bracket welding, and a construction material such as a decorative panel.

The MIG welded joint 10 between the aluminum member 12 and the steel member 14 according to the present embodiment can be obtained by welding the aluminum member 12 and the steel member 14 according to a particular MIG welding process as will be described below, for example.

Specifically, in order to obtain the MIG welded joint 10 of the present embodiment, first, as shown in FIG. 3, the planar aluminum member 12 and the planar steel member 14 having the different thicknesses (P and Q) as described above are overlapped with each other at end regions thereof in such a manner that the aluminum member 12 is positioned at the upper side. While keeping the members overlapped, the members are preferably fixed by an appropriate restraint jig, which is not shown in the drawing, so as not to move relatively to each other. Next, while keeping the members fixed, the MIG welding operation is performed at the end face region of the aluminum member 12 under a condition that has not been implemented in any known related technique.

More specifically, in the MIG welding operation of the present invention, the same MIG welder as used in the known technique is used, which has a filler wire 26 as a consumable electrode protruded by a predetermined length from a tip opening portion 30 of a nozzle 28. In the MIG welder, the filler wire 26 is allowed to be independently moved in the axial direction of the nozzle 28 by a wire supply apparatus, which is not shown in the drawing. Due to the consumption or the like of the filler wire 26, the filler wire 26 can be supplied toward the weld zone (a lower side). In addition, in order to isolate the weld metal from the atmosphere, at the arc welding process, the nozzle 28 sprays inert gas 32 (indicated by two-dotted chain lines in FIG. 4) composed of one of argon gas, helium gas, neon gas, and the like or a mixture of two or more kinds thereof onto the weld zone. Furthermore, the filler wire 26 is connected to a positive pole of a welding power supply apparatus, which is not shown, via a contact tip 34, so that the filler wire 26 has a positive polarity (anode), whereas the members 12 and 14 to be welded, which are grounded, are connected to a negative pole of the welding power supply apparatus, so that the members 12 and 14 have a negative polarity (cathode).

Figure 4:
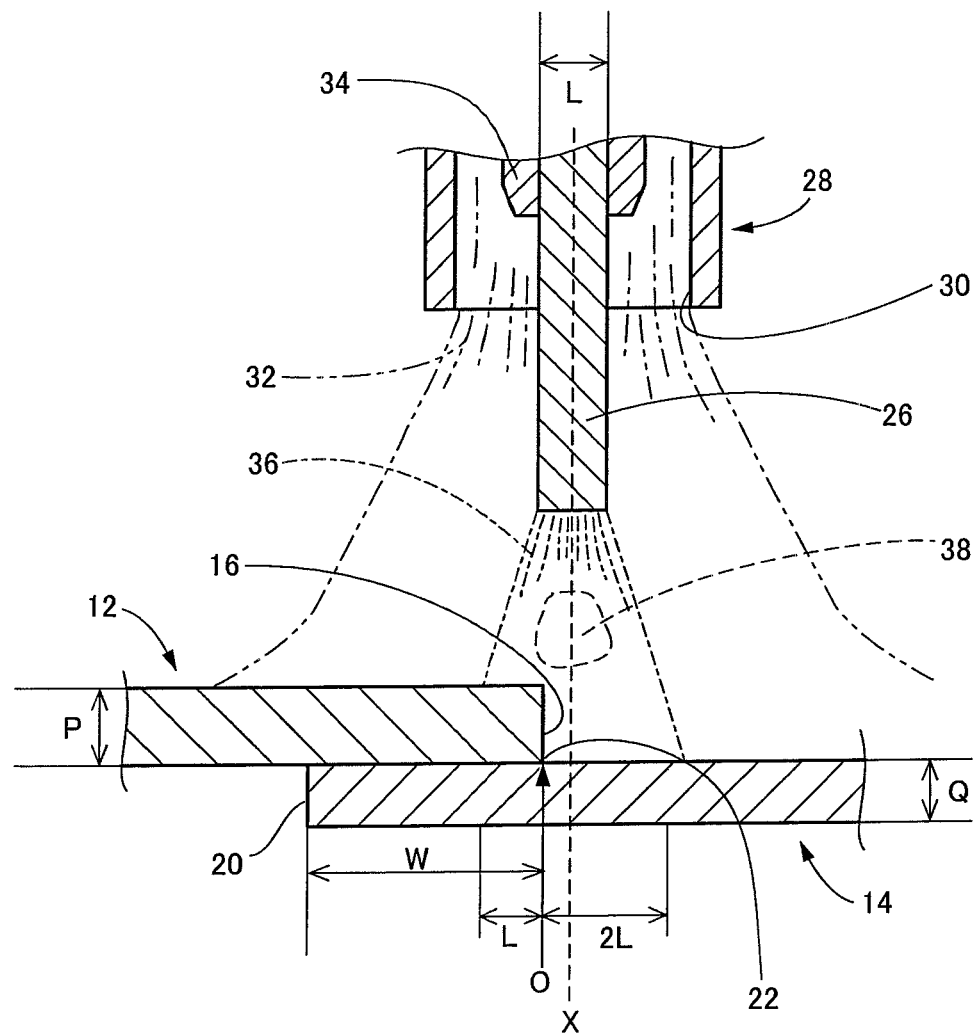
FIG. 4 is an elevational view in axial cross section showing a step of MIG welding between the aluminum and steel members according to a MIG welding process of the present invention and showing a state where the members to be welded are overlapped with each other and a nozzle of a MIG welder is located above an overlapped region from a side of the aluminum member.
Figure 5:
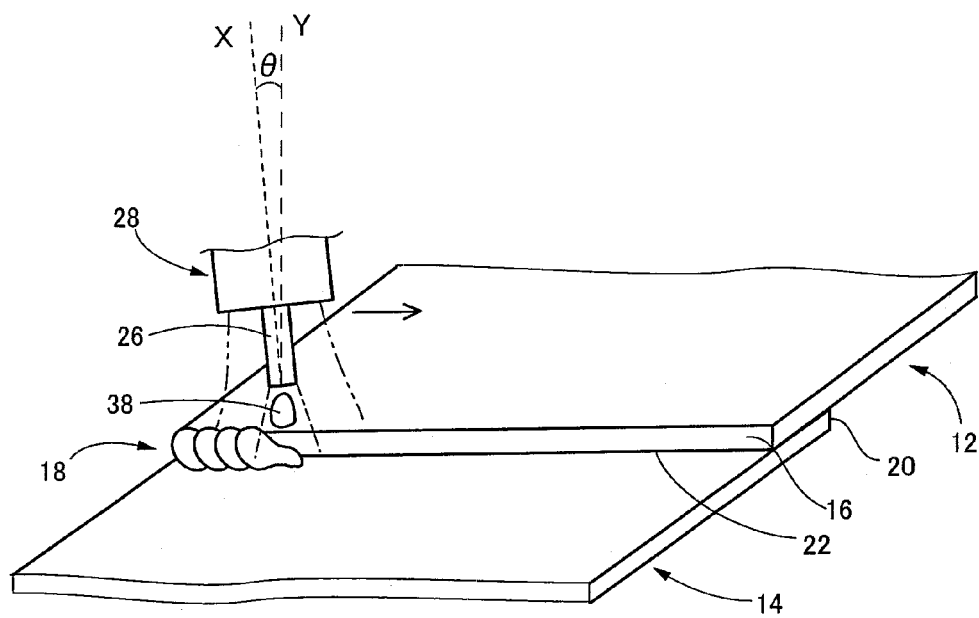
FIG. 5 is a perspective view showing a step of MIG welding between the aluminum and steel members according to the MIG welding process of the present invention and showing a state where a droplet is transferred from the filler wire.

Then, the not-shown welding power supply apparatus is operated to apply a welding current and an arc voltage between the filler wire 26 and the members 12 and 14 to be welded, at predetermined levels, in order to generate an arc 36 (indicated by a single-dotted chain line in FIG. 4) between a tip portion of the filler wire 26 and the members to be welded. Meanwhile, as shown in FIG. 5, the nozzle 28 (filler wire 26) is moved relatively along the end face 16 of the aluminum member 12, in general, at a speed of approximately 7 to 13 mm per second, thereby proceeding the MIG welding between the aluminum member 12 and the steel member 14.

In the above situation, the arc 36 generated between the members 12, 14 to be welded and the filler wire 26 allows the end face region of the aluminum member 12 to be melted. In addition to that, the filler wire 26 is also melted and whereby a droplet 38 thereof is transferred onto the members to be welded. The molten aluminum (molten metal) welds the aluminum member 12 and the steel member 14 together, thereby forming the weld zone 18 (bead portion) made of the weld metal 19.

In the MIG welding operation, in order to strongly weld the aluminum member 12 and the steel member 14 together as described above, the filler wire 26 may be a solid wire made of the aluminum alloy material of 4000 series (Al—Si series) or 5000 series (Al—Mg series). If a diameter L of the filler wire 26 becomes too small, it is difficult to supply the filler wire 26. If a diameter L thereof becomes too large, a large amount of a welding current is required to melt the filler wire 26, which increases the heat input, and consequently, an intermetallic compound can be easily formed by an interface reaction between the aluminum member 12 and the steel member 14, thereby producing a brittle welded interface. Consequently, the filler wire 26 used in the embodiment has a diameter L ranging from 0.8 to 1.6 mm.

In addition, in the MIG welding operation, if a target position of a torch (a nozzle position) is too distant from the end face 16 of the aluminum member 12 in a horizontal direction (in the right and left direction of FIG. 4), it is impossible to form the sound weld zone 18 having the sectional shape as shown in FIG. 2. Therefore, in the present welding operation, as shown in FIG. 4, a corner 22 of the end face 16 of the aluminum member 12 on the steel member side is set as a reference point O and the nozzle 28 (filler wire 26) is arranged such that a center line X of the filler wire 26 is constantly positioned between a distance of L away from the point O toward the overlapped region (on a left side from the point O in FIG. 4) and a distance of 2L away from the point O toward the side opposite to the overlapped region (on a right side therefrom in FIG. 4). Then, while maintaining the above position, the nozzle 28 (filler wire 26) is moved relatively along the end face 16 of the aluminum member 12. In this case, the center line X of the above filler wire 26 represents a center line of a portion of the filler wire protruding from the tip opening portion 30 of the nozzle 28.

If the center line X of the above filler wire 26 is located at a position beyond the distance of L toward the overlapped region from the reference point, high heat input is required for sufficiently melting a larger portion of the aluminum member 12 placed on the upper side. As a result, a brittle intermetallic compound layer is thickly formed. Conversely, if the center line X thereof is located at a position beyond the distance of 2L toward the opposite side of the overlapped region, the arc 36 does not reach the aluminum member 12 located at the upper side, which makes it impossible to melt the end face 16 of the aluminum member 12 or which makes it necessary to adjust an welding current or an arc voltage to increase a bead width so as to form the weld zone 18 (bead portion) at the overlapped region between the aluminum member 12 and the steel member 14. As a result, heat input becomes excessively high, so that a brittle intermetallic compound layer is likely to be thickly formed.

An arrangement position of the nozzle 28 (filler wire 26) in the vertical direction can be determined depending on power properties of welding machine, material or diameter of the filler wire or the like. Preferably, the nozzle 28 is located such that a distance between the head of the nozzle 28, i.e. the tip of the filler wire 26 and the surface of the upper plate (aluminum) is about 3 to 17 mm, more preferably about 3 to 12 mm. The shielding performance by inert gas 32 can be highly secured by the above arrangement.

Furthermore, in the MIG welding operation of the present embodiment, particularly, a pulsed DC (see FIG. 6) is applied to the filler wire 26, which allows a spray transfer to be caused in which one droplet falls with each pulse (see FIG. 4) at a pulse frequency of 0.5 to 5 times per a welding length of 1 mm. By applying the pulsed DC, a cleaning action for removing an oxide film on a surface of the base metal can be exhibited, thereby improving weldability. In addition, since heat input can be controlled at a low level, penetration of the steel member 14 can favorably be prevented. The pulse form (waveform), value of peak current, value of base current or the like can be adjusted depending on the arc voltage to be applied, kind of or diameter of the filler wire 26, diameter of the filler wire 26 or the like such that the arc 36 is continuously generated between the end of the filler wire 26 and the members to be welded.

In the above situation, the reason for applying the pulsed current is as follows. In a case of a non-pulsed DC, an average welding current level becomes higher and whereby heat input to the base metal becomes excessively high. Therefore, a regular metal transfer is stably performed at a low average welding current level, which allows the heat input to be controlled at a low level, so that heat more than necessary is not applied to the members to be welded. In addition, the reason for employing the pulsed DC instead of pulsed AC is as follow. The cleaning action to the members to be welded can be constantly exhibited by maintaining the filler wire 26 constantly as the positive pole (anode), whereby the zone to be welded is set to have a clean metallic surface (a refreshed surface). Thus, the molten aluminum can effectively be spread wettingly on the zone to be welded, so that the sound weld zone 18 can be formed. In the case of AC, at the time when the filler wire 26 is switched from the positive pole to the negative pole, the cleaning action cannot be exhibited. Thus, a defective portion is likely to be generated at the weld zone 18. The reason why the spray transfer requiring higher current than a critical current is selected from the metal transfers is as follows. The input heat of a globular transfer requiring lower current than the critical current is so low that the sufficient heat is not applied to the members to be welded and the aluminum member 12 cannot be melt sufficiently. In addition, the surface of the steel member 14 cannot be wetted and consequently fine wielding portion 18 may not be obtained.

As described above, a major characteristic of the MIG welding operation is that the pulsed DC for the spray transfer is adjusted to cause the spray transfer mode which allows one droplet 38 to detach from the tip portion of the filler wire 26 with each pulse regularly and also the pulse frequency to be in the range of 0.5 to 5 times per a welding length of 1 mm. With the pulsed DC applied, the foregoing cleaning action can be effectively exhibited, thereby increasing the wettability of the surface of the steel member 14. As a result, molten metals of the aluminum member 12 and the filler wire 26 can favorably be spread wettingly without being repelled from the surface of the steel member 14 and rolled thereon. In addition, due to the control of heat input, the end face region of the aluminum member 12 is sufficiently molten, while penetration of the steel member 14 can be effectively prevented, thereby forming the sound weld zone 18 without any defect. Consequently, any breaking or separation at a welded interface can be favorably prevented.

When the spray transfer in which one droplet per pulse is transferred cannot be obtained, more specifically, when one droplet per several pulses is transferred, a continuous bead cannot be obtained and a defective portion is formed. In addition, when several droplets per pulse are transferred, a pulsed current density is increased and heat input becomes excessively high, thereby thickly forming a brittle intermetallic compound layer at the welded interface, as well as there arises a problem of increasing the amount of spatter. As can be seen from the above, when the spray transfer in which one droplet per pulse is transferred cannot be obtained, in any case, a breaking or separation can occur at the weld zone.

Meanwhile, when the above pulse frequency is less than 0.5 times/mm, as in the case of the one droplet per several pulses described above, a continuous bead cannot be obtained, so that the sound weld zone 18 cannot be formed. When the pulse frequency is more than 5 times/mm, heat input to the welded members becomes excessively high, and consequently, a brittle intermetallic compound layer is thickly formed at the welded interface. In the both cases, a breaking or separation at the weld zone is likely to be occurred. The pulse frequency (times/mm) can be appropriately adjusted by changing the pulse frequency (times/s) according to a welding speed (mm/s), or conversely by changing the welding speed according to the pulse frequency (times/s). When the welding speed is fast, the pulse frequency (times/s) is adjusted to be increased and when the welding speed is slow, the pulse frequency (times/s) is adjusted to be decreased, thereby adjusting the pulse frequency (times/mm) to fall within the above range.

Figure 6:
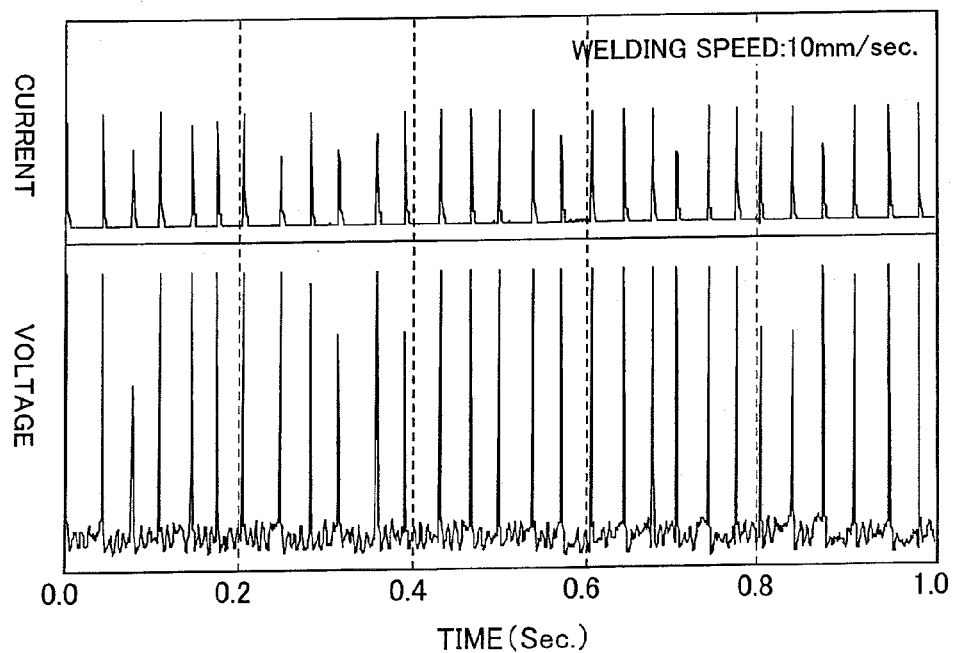
FIG. 6 is an explanatory diagram showing an example of waveforms of a pulsed DC and an arc voltage used in the MIG welding process according to the present invention, in which the waveform of the pulsed DC is shown in an upper side and the waveform of the arc voltage corresponding to the current is shown in a lower side.

For example, in FIG. 6, there is shown an example of a current waveform and a corresponding arc voltage waveform arranged in upper and lower directions. Then, for example, while applying such a pulsed DC, welding may be performed at a speed of 10 mm/second, which can favorably realize the above-mentioned one-droplet-per-pulse transfer mode in which one droplet is transferred per pulse. In the current waveform shown in FIG. 6, 28 peaks per second appear. Thus, when the welding speed is 10 mm/second, the pulse frequency is 2.8 times per a welding length of 1 mm.

As described above, in the state where the aluminum member 12 and the steel member 14 having the predetermined thicknesses are overlapped with each other and the filler wire 26 made of an aluminum alloy of the 4000 or 5000 series is arranged at the predetermined position, the MIG welding operation is performed by applying the pulsed DC which allows the spray transfer to be caused in which one droplet falls with each pulse at the pulse frequency of 0.5 to 5 times per a welding length of 1 mm. As a result, the aluminum member 12 and the steel member 14 are arc-welded and integrated with each other, so that the intended MIG welded joint 10 can be obtained. In the obtained MIG welded joint 10, as described above, penetration of the steel member 14 can be favorably suppressed. Thus, regardless of the presence or absence of the surface-coated layer on the steel member surface, the penetration depth of the steel member 14 is set to an approximately 0% to 5% of the thickness Q of the steel member 14, which can prevent that an intermetallic compound layer is thickly formed at the welded interface and suppress deformation due to heat distortion at the weld zone 18. As a result, the soundness of the weld zone 18 can be favorably increased.

Due to the performance of the MIG wielding in the above condition, it can be prevented that the temperature of the welding metal is to be excessively high. The droplet 38 fallen from the filler wire 26 onto the members to be welded clearly remains on the members imbricately without melting away, thereby forming substantially the same number of the convexities of the surface ripple as the droplets of the spray transfer in the weld zone 18 (bead portion). Specifically, the MIG welding operation according to the present invention allows one droplet to fall with each pulse at a pulse frequency of 0.5 to 5 times per a welding length of 1 mm. Consequently, the number of the convexities of the ripple which cannot be obtained by the conventional welding process can be formed on the welding zone 18 (bead portion) for the first time, namely 5 to 50 convexities of the surface ripple per a welding length of 1 mm can be obtained.

Accordingly, when the aluminum member 12 and the steel member 14 are welded with each other by using the above special MIG welding process, the soundness of the weld zone can be increased, thereby advantageously obtaining a MIG welded joint with an excellent welding quality.

While the present invention has been described in detail, for the illustrative purpose only, it is to be understood that the invention is not limited to the details of the illustrated embodiment.

For example, in the above embodiment, the corner 22 of the aluminum member 12 on the steel member side has right angle (90 degrees). However, the MIG welding process according to the present invention can also be applied to a case of using the aluminum member 12 that has the corner on the steel member side sharpen by beveling or edge preparation.

In addition, in the above example, as apparent from FIG. 4, the center line X of the filler wire 26 is in parallel to the end face of the aluminum member 12. However, it is also possible to perform the MIG welding operation by inclining the nozzle 28 with respect to the end face thereof. Even in this case, as described above, the nozzle 28 (the filler wire 26) is arranged such that the center line X of the filler wire 26 is positioned between the distance of L away from the corner 22 on the steel member side (the reference point O) toward the overlapped region and the distance of 2L away from the corner 22 toward the side opposite to the overlapped region. More specifically, the nozzle 28 (the filler wire 26) is arranged such that an intersecting point between the center line X of the filler wire 26 and the upper surface of the steel member 14 is positioned within the above range.

FIG. 5 shows the MIG welding operation in which the nozzle 28 (filler wire 26) is inclined to a direction of travel such that the angle θ formed by a vertical line Y extending in a direction intersecting perpendicularly to a horizontal direction (namely, in upper and lower directions in FIG. 5) and the center line X of the filler wire 26 is in the range of 5 degree or less. However, the inclination angle of the nozzle 28 (filler wire 26) to the direction of travel can be appropriately determined as in the conventional MIG welding technique.

It is to be understood that the present invention may be embodied with various modifications which may occur to the those skilled in the art, without departing from the spirit and scope of the invention.

EXAMPLES

Hereinafter, various examples of the present invention will be provided to further clarify the invention. However, it is to be understood that the present invention is not limited to the details of the examples.

Experiment 1

First, as shown in the following Table 1, as the aluminum member (Al member; 12), there is prepared an aluminum plate (5456, H material) of the 5000 series having a thickness (P) of 1.5 mm and tensile strength of 310 MPa in an O temper condition. As the steel member (14), there is prepared a galvannealed steel (GA steel plate) having a thickness (Q) of 1.05 mm. Then, the aluminum member (12) and the steel member (14) are overlapped with each other and fixed so as to have the overlap width (W) of 5 mm. The tensile strength of the Al member in the O temper condition was measured based on the JIS Z 2241 by using a plate specimen (No. 5) defined in the JIS Z 2201.

Next, as the MIG welder, a precision control type MIG welder was used that is equipped with the filler wire (26) made of a 5000 series aluminum alloy (5554) and having a diameter (L) of 0.8 mm. The MIG welder is connected to the welding power supply equipment such that the filler wire (26) is connected to the positive pole and the members to be welded are connected to the negative pole. Thereafter, arc is generated between the welder and the members to be welded, and the nozzle (28) of the MIG welder is moved relatively along the end region of the aluminum member (12) at the welding speed of 10 mm per second. As a result, the MIG welding was performed and a MIG welded joint of Experiment 1 was obtained.

Specifically, as shown in the following Table 2, a pulsed DC was applied so as to allow a spray transfer in which one droplet is fallen per pulse at the pulse frequency of 0.5 times per a welding length of 1 mm. Meanwhile, the nozzle (28) was arranged such that the center line X of the filler wire is located at a distance of 0.8 mm toward the overlapped region from the corner (22) of the aluminum member (12) located on the steel member side. Then, the nozzle (28) was moved relatively along the end region of the aluminum member (12) to perform the MIG welding process.

Then, by using the MIG welded joint obtained in the above manner according to Experiment 1, determination of the number of the convexities of the surface ripples and a tensile test (tension shear test) were performed.

Specifically, in order to determine the number of the convexities of the ripple, the pattern of the ripple on the stationary weld zone is measured by a contour measuring instrument (Contracer produced by Mitutoyo Corporation, Japan). When the difference in height between a convexity and at least one of adjacent concavities (recessed portions) is 10 μm or more, the convexity is counted as one, whereby the number of the convexities of the ripple per welding length of 1 cm is determined. As a result, the number of the convexities of the ripple of the MIG welded joint according to Experiment 1 was 6.

The tensile strength test (tension shear test) of the welded joint was conducted based on the JIS Z 2241, as in the above-described tensile strength test of the material in O temper condition. Specifically, a test specimen (grip portion width: 30 mm, parallel portion width: 25 mm, radius of fillet (R): 30 mm, and reference point distance: 50 mm) was produced. Then, an extensometer was mounted on the test specimen. Until the extensometer indicated a value of 1 mm, a crosshead speed of the tensile testing machine was set to 5 mm per second, and after indicating 1 mm, the crosshead speed thereof was set to 50 mm per minute and the specimen was pulled until the test specimen is broken. Then, based on an obtained maximum load, a maximum stress of the joint and a joint efficiency were calculated by the following formula. As a result, regarding the MIG welded joint of Experiment 1, the maximum stress (breaking stress) of the joint was 310 MPa and the joint efficiency was 100%.

Maximum stress of joint (MPa)=(Maximum load of joint/Cross-sectional area of Al member)

Joint efficiency (%)=(Maximum stress of joint/Tensile strength of Al member in O temper condition)×100

Results obtained by the tension shear test were evaluated based on the following evaluation criteria, which indicated that the MIG welded joint of Experiment 1 was evaluated as "excellent".

Excellent: satisfies all of conditions (1) to (3) below;

Very good: dissatisfies only the condition (3) below;

Good: dissatisfies the condition (2) below; and

Poor: dissatisfies the condition (1) below.

Conditions:

(1) Joint efficiency is 50% or more.

(2) Breaking occurs not at the weld zone (the welded interface) but in the Al member as the base metal.

(3) Maximum stress of the joint is 70 MPa or more.

Experiments 2 to 34

Like the above Experiment 1, as the Al member (12) and the steel member (14), two plate members were prepared that has a material, a thickness, and a tensile strength in a O temper condition that are shown in the following Table 1. The plate members were overlapped with each other and fixed so as to have the overlap width (W) shown in the Table 1. Regarding the temper of the Al member, the temper H was employed for aluminum members made of 1000 and 5000 series, and the temper T was employed for aluminum members made of 6000 and 7000 series.

Next, by using the MIG welder equipped with the filler wire (26) made of aluminum alloy each having diameter (L) and material shown in the Table 1, a welding current and an arc voltage were applied such that the filler wire (26) has the positive polarity to generate an electric arc causing the spray transfer between the members to be welded and the filler wire. Then, the nozzle (28) of the MIG welder was moved relatively along the end region of the aluminum member (12) at the welding speed of 10 mm per second to perform the MIG welding process, so that a MIG welded joint of each Experiment 2 to 34 was obtained. In the MIG welding operations, conditions shown in the following Table 2 were employed, which includes the position of the center line X of the filler wire, the number of droplet per pulse, the pulse frequency, and the short circuit frequency.

After that, using the each obtained MIG welded joint of Experiments 2 to 34, determination of the number of the convexities of the ripple and the tension shear test as described above were performed. Results thereof were shown together in the following Table 2.

TABLE 1

| | Al Member | | | Steel Member | | | | Filler Wire | |
|---|---|---|---|---|---|---|---|---|---|
| EXPERIMENTS | Material | Tensile Strength in O temper condition [MPa] | P [mm] | Material | Q [mm] | Q/P | W [mm] | Material | L [mm] |
| 1 | 5456 | 310 | 1.5 | GA Steel Plate | 1.05 | 0.7 | 5 | 5554 | 0.8 |
| 2 | 6111 | 140 | 1.8 | High Strength Steel | 1.44 | 0.8 | 6 | 5654 | 1.0 |
| 3 | 6016 | 110 | 2.0 | SUS | 1.20 | 0.6 | 6 | 5356 | 1.2 |
| 4 | 7075 | 230 | 0.5 | Aluminum-coated Steel Plate | 0.35 | 0.7 | 3 | 5556 | 1.6 |
| 5 | 5083 | 290 | 0.8 | Mild Steel Sheet | 0.64 | 0.8 | 4 | 5183 | 0.8 |
| 6 | 5052 | 195 | 1.0 | GI Steel Plate | 0.60 | 0.6 | 5 | 4043 | 1.0 |
| 7 | 6009 | 120 | 1.2 | GA Steel Plate | 0.84 | 0.7 | 4 | 4047 | 1.2 |
| 8 | 6010 | 140 | 1.5 | High Strength Steel | 1.20 | 0.8 | 5 | 5554 | 1.6 |

TABLE 1-continued

| | Al Member | | | Steel Member | | | | Filler Wire | |
|---|---|---|---|---|---|---|---|---|---|
| EXPERIMENTS | Material | Tensile Strength in O temper condition [MPa] | P [mm] | Material | Q [mm] | Q/P | W [mm] | Material | L [mm] |
| 9 | 7003 | 190 | 1.8 | SUS | 1.08 | 0.6 | 6 | 5654 | 0.8 |
| 10 | 5182 | 270 | 2.0 | Aluminum-coated Steel Plate | 1.40 | 0.7 | 6 | 5356 | 1.0 |
| 11 | 5454 | 250 | 0.5 | Mild Steel Sheet | 0.40 | 0.8 | 3 | 5556 | 1.2 |
| 12 | 6022 | 110 | 0.8 | GI Steel Plate | 0.48 | 0.6 | 5 | 5183 | 1.6 |
| 13 | 6061 | 120 | 1.0 | GA Steel Plate | 0.70 | 0.7 | 4 | 4043 | 0.8 |
| 14 | 7N01 | 200 | 1.2 | High Strength Steel | 0.96 | 0.8 | 4 | 4047 | 1.0 |
| 15 | 5154 | 235 | 1.5 | SUS | 0.90 | 0.6 | 5 | 5554 | 1.2 |
| 16 | 5N01 | 110 | 1.8 | Aluminum-coated Steel Plate | 1.26 | 0.7 | 6 | 5654 | 1.6 |
| 17 | 6063 | 90 | 2.0 | Mild Steel Sheet | 1.60 | 0.8 | 6 | 5356 | 0.8 |
| 18 | 6N01 | 100 | 0.5 | GI Steel Plate | 0.30 | 0.6 | 5 | 5556 | 1.0 |
| 19 | 7178 | 230 | 0.8 | GA Steel Plate | 0.56 | 0.7 | 4 | 5183 | 1.2 |
| 20 | 5056 | 290 | 1.0 | High Strength Steel | 0.80 | 0.8 | 3 | 4043 | 1.6 |
| 21 | 7075 | 230 | 0.5 | SUS | 0.30 | 0.6 | 2 | 5654 | 0.8 |
| 22 | 5052 | 195 | 1.1 | Aluminum-coated Steel Plate | 0.77 | 0.7 | 3 | 5356 | 1.0 |
| 23 | 1060 | 70 | 1.0 | GA Steel Plate | 0.70 | 0.7 | 4 | 4043 | 0.8 |
| 24 | 5182 | 270 | 1.0 | Mild Steel Sheet | 0.60 | 0.6 | 3 | 5556 | 1.0 |
| 25 | 6111 | 140 | 0.8 | GI Steel Plate | 0.56 | 0.7 | 3 | 5183 | 0.8 |
| 26 | 6016 | 110 | 0.5 | GA Steel Plate | 0.40 | 0.8 | 3 | 4043 | 1.6 |
| 27 | 7075 | 230 | 2.0 | High Strength Steel | 1.20 | 0.6 | 6 | 4047 | 1.2 |
| 28 | 5456 | 310 | 1.2 | SUS | 0.84 | 0.7 | 4 | 5554 | 1.0 |
| 29 | 5083 | 290 | 0.8 | Aluminum-coated Steel Plate | 0.64 | 0.8 | 3 | 5654 | 0.8 |
| 30 | 5N01 | 110 | 2.0 | Mild Steel Sheet | 0.60 | 0.3 | 6 | 5183 | 1.6 |
| 31 | 5083 | 290 | 1.8 | GI Steel Plate | 1.80 | 1.0 | 6 | 4043 | 1.2 |
| 32 | 5182 | 270 | 0.3 | SUS | 0.24 | 0.8 | 3 | 5356 | 0.8 |
| 33 | 7N01 | 200 | 3.0 | Aluminum-coated Steel Plate | 1.80 | 0.6 | 9 | 5556 | 1.6 |
| 34 | 6061 | 120 | 1.0 | GA Steel Plate | 0.70 | 0.7 | 4 | 1100 | 0.8 |

TABLE 2

| | Welding Condition | | | Number of Convexities | Shear Tension Test | | | |
|---|---|---|---|---|---|---|---|---|
| EXPERIMENTS | Position of X* [mm] | Number of Droplets per pulse | Pulse Frequency [time/mm] | of Ripple per welding length of 1 cm | Joint Efficiency [%] | Breaking Region | Breaking Stress [MPa] | Evaluation |
| 1 | −0.8 | 1 | 0.5 | 6 | 100 | Base Metal | 310 | Excellent |
| 2 | −0.5 | 1 | 1 | 12 | 71 | Base Metal | 99 | Excellent |
| 3 | 0 | 1 | 2 | 18 | 72 | Base Metal | 79 | Excellent |
| 4 | +0.8 | 1 | 3 | 26 | 76 | Base Metal | 175 | Excellent |
| 5 | +0.8 | 1 | 4 | 39 | 100 | Base Metal | 290 | Excellent |
| 6 | +1.5 | 1 | 5 | 48 | 100 | Base Metal | 195 | Excellent |
| 7 | +2.4 | 1 | 0.5 | 7 | 70 | Base Metal | 84 | Excellent |
| 8 | −1.6 | 1 | 1 | 9 | 73 | Base Metal | 102 | Excellent |
| 9 | −0.4 | 1 | 2 | 19 | 77 | Base Metal | 146 | Excellent |
| 10 | 0 | 1 | 3 | 31 | 100 | Base Metal | 270 | Excellent |
| 11 | +0.6 | 1 | 4 | 37 | 100 | Base Metal | 250 | Excellent |
| 12 | +1.6 | 1 | 5 | 42 | 71 | Base Metal | 78 | Excellent |
| 13 | +1.2 | 1 | 0.5 | 5 | 70 | Base Metal | 84 | Excellent |
| 14 | +2.0 | 1 | 1 | 8 | 76 | Base Metal | 152 | Excellent |
| 15 | −1.2 | 1 | 2 | 17 | 100 | Base Metal | 235 | Excellent |
| 16 | −0.8 | 1 | 3 | 29 | 100 | Base Metal | 110 | Excellent |
| 17 | 0 | 1 | 4 | 41 | 78 | Base Metal | 70 | Excellent |
| 18 | +0.5 | 1 | 5 | 49 | 72 | Base Metal | 72 | Excellent |
| 19 | +0.6 | 1 | 0.5 | 5 | 75 | Base Metal | 173 | Excellent |
| 20 | +0.8 | 1 | 1 | 11 | 100 | Base Metal | 290 | Excellent |
| 21 | +0.4 | 1 | 2 | 22 | 75 | Base Metal | 173 | Excellent |
| 22 | +0.5 | 1 | 4 | 44 | 100 | Base Metal | 195 | Excellent |
| 23 | +1.2 | 1 | 0.5 | 6 | 93 | Base Metal | 65 | Very Good |
| 24 | +3.0 | 1 | 3 | 4 | 60 | Interface | 162 | Good |
| 25 | −2.4 | 1 | 5 | 3 | 55 | Interface | 77 | Good |
| 26 | +0.8 | 0.3 | 0.5 | 2 | 58 | Interface | 64 | Good |
| 27 | +0.6 | 3 | 5 | 27 | 69 | Interface | 159 | Good |
| 28 | +0.5 | 1 | 0.3 | 3 | 90 | Interface | 279 | Good |
| 29 | +0.4 | 1 | 7 | 81 | 85 | Interface | 247 | Good |
| 30 | +0.8 | 2 | 10 | 67 | 20 | Interface | 22 | Poor |
| 31 | +0.6 | 2 | 10 | 4 | 20 | Interface | 58 | Poor |
| 32 | +0.4 | 2 | 10 | 3 | 20 | Interface | 54 | Poor |

TABLE 2-continued

| | Welding Condition | | | Number of Convexities | Shear Tension Test | | | |
|---|---|---|---|---|---|---|---|---|
| EXPERIMENTS | Position of X× [mm] | Number of Droplets per pulse | Pulse Frequency [time/mm] | of Ripple per welding length of 1 cm | Joint Efficiency [%] | Breaking Region | Breaking Stress [MPa] | Evaluation |
| 33 | +0.8 | 2 | 10 | 55 | 20 | Interface | 40 | Poor |
| 34 | +1.2 | 1 | 0.5 | 5 | 20 | Interface | 24 | Poor |

×The corner of the Al material on the steel member side was set as a reference point (O), and the overlapped region was defined as (−) side and the opposite side thereof was defined as (+) side.

As obvious from the results shown in the Table 2, in the each MIG welded joint of Experiments 1 to 22, the number of the convexities of the ripple per welding length of 1 cm is 5 to 50, as well as the evaluation result of the tension test was "excellent", which shows that the aluminum and steel members were very favorably welded. In the MIG welded joint of Experiment 23, as the aluminum member, there was used an aluminum plate of 1000 series having tensile strength of less than 90 MPa in O temper condition. Accordingly, although it is inferior in breaking stress, breaking occurred in the base metal, that is, the welding by the MIG welding has been favorably performed.

In the each MIG welded joint of Experiments 24 to 29, one of the welding conditions (the position of X, the number of droplet per pulse, and the pulse frequency) shown in the Table 2 fell outside the range described above, thereby a breaking or a separation occurred at the welded interface. However, the experiments have a joint efficiency of 50% or more. Therefore, the tensile strength of each Experiments 24 to 29 is evaluated as "Good".

In the each MIG welded joint of Experiments 30 to 34, there was employed the steel member whose ratio of the thickness to the thickness of the aluminum member (Q/P) does not fall within the range of 0.6 to 0.8, or the aluminum member whose thickness does not fall within the range of 0.5 to 2.0 mm, or the filler wire which was made of an aluminum alloy of 1000 series. Consequently, any of the experiments has a low joint efficiency of 20% and the tensile strength was evaluated as "Poor".

What is claimed is:

1. A process for performing MIG welding between aluminum and steel members, by overlapping the aluminum member with and the steel member and performing a MIG welding operation on an end face of the aluminum member, said process comprising:

providing an aluminum member having a thickness P ranging from 0.5 to 2.0 mm and a steel member having a thickness Q satisfying the following formula: $0.6 \leq Q/P \leq 0.8$, and arranging the aluminum member and the steel member so that the aluminum member and the steel member overlap with each other and so that the aluminum member is positioned above the steel member;

providing a filler wire made of a 4000 or 5000 series aluminum alloy having a diameter L ranging from 0.8 to 1.6 mm;

locating the filler wire such that a center line of the filler wire is parallel to the end face of the aluminum member and is positioned between a distance of L away from a reference point toward an overlapped region of the aluminum member and the steel member and a distance of 2L away from the reference point toward a side opposite to the overlapped region, the reference point being set at a corner of the end face of the aluminum member on the steel member side; and applying a pulsed DC to the filler wire, the pulsed DC allowing a spray transfer to be caused in which one molten droplet falls with each pulse at a pulse frequency of 0.5 to 5 times per a welding length of 1 mm, whereby the MIG welding operation is performed along the end face of the aluminum member to form a joined welded member, whereby the joined welded member has a joint efficiency of 50% or more, is free of breakage in the weld zone between the aluminum and steel members, and a maximum stress of the weld joint is 70 MPa or more.

2. The process for performing MIG welding between aluminum and steel members according to claim 1, wherein the aluminum member has tensile strength of 90 MPa or more in an O temper condition.

3. The process for performing MIG welding between aluminum and steel members according to claim 1, wherein the aluminum member is made of one of a 5000 series aluminum alloy, a 6000 series aluminum alloy, and a 7000 series aluminum alloy.

4. The process for performing MIG welding between aluminum and steel members according to claim 1, wherein the steel member is made of one of non-surface-coated mild steel, carbon steel, high tensile strength steel, and stainless steel.

5. The process for performing MIG welding between aluminum and steel members according to claim 1, wherein the steel member is made of one of hot-dip zinc-coated steel, galvannealed steel, aluminum alloy coated steel, and electro-galvanized steel.

6. The process for performing MIG welding between aluminum and steel members according to claim 1, wherein the filler wire is located such that a distance between a tip of the filler wire and the surface of the aluminum member is 3 to 17 mm.

7. The process for performing MIG welding between aluminum and steel members according to claim 1, wherein the filler wire is constantly maintained as the positive pole.

8. The process for performing MIG welding between aluminum and steel members according to claim 1, wherein the nozzle is moved relatively along the end face of the aluminum member at a speed of 7 to 13 mm per second.

* * * * *